United States Patent
Ferraro et al.

(10) Patent No.: US 7,183,332 B2
(45) Date of Patent: Feb. 27, 2007

(54) PROCESS FOR THE PREPARATION OF POROUS POLYMERS AND POLYMERS OBTAINABLE THEREOF

(75) Inventors: Angelo Ferraro, Bologna (IT); Giovanni Baruzzi, Ferrara (IT); Constantine A. Stewart, Albuquerque, NM (US); Ofelia Fusco, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/450,603

(22) PCT Filed: Dec. 21, 2001

(86) PCT No.: PCT/EP01/15394

§ 371 (c)(1),
(2), (4) Date: Jul. 13, 2003

(87) PCT Pub. No.: WO02/051887

PCT Pub. Date: Jul. 4, 2002

(65) Prior Publication Data

US 2004/0092615 A1 May 13, 2004

(30) Foreign Application Priority Data

Dec. 22, 2000 (EP) .................................. 00204743

(51) Int. Cl.
*C08F 10/06* (2006.01)
*C08F 4/02* (2006.01)
*C08L 23/10* (2006.01)

(52) U.S. Cl. ........................ 521/142; 521/143; 521/144; 526/160; 526/346; 526/348.6; 526/351; 526/943

(58) Field of Classification Search ................ 521/143, 521/144, 142; 526/160, 346, 348.6, 351, 526/943
See application file for complete search history.

(56) References Cited

U.S. PATENT DOCUMENTS

| | | | |
|---|---|---|---|
| 4,220,554 A | 9/1980 | Scatá et al. ............. 252/429 B |
| 4,298,718 A | 11/1981 | Mayr et al. ................. 526/125 |
| 4,399,054 A | 8/1983 | Ferraris et al. .......... 252/429 B |
| 5,221,651 A | 6/1993 | Sacchetti et al. ........... 502/126 |
| 5,239,022 A | 8/1993 | Winter et al. ............... 526/127 |
| 5,243,001 A | 9/1993 | Winter et al. ............... 526/127 |
| 5,556,893 A | 9/1996 | Costa et al. ................. 521/143 |
| 5,556,928 A | 9/1996 | Devore et al. .............. 526/127 |
| 5,648,422 A | 7/1997 | Collina et al. ................ 525/52 |
| 6,451,726 B1 * | 9/2002 | Zambon et al. ............. 502/152 |
| 6,482,902 B1 | 11/2002 | Bohnen et al. ............. 526/127 |
| 6,797,794 B2 * | 9/2004 | Zambon et al. ............. 526/351 |

FOREIGN PATENT DOCUMENTS

| | | |
|---|---|---|
| EP | 0045977 | 2/1982 |
| EP | 0295312 | 12/1988 |
| EP | 0361494 | 4/1990 |
| EP | 0395083 | 10/1990 |
| EP | 0485820 | 5/1992 |
| EP | 0485822 | 5/1992 |
| EP | 0598543 | 5/1994 |
| EP | 0720629 | 7/1996 |
| EP | 0742801 | 11/1996 |
| EP | 0789037 | 8/1997 |
| WO | 9200333 | 1/1992 |
| WO | 9602583 | 2/1996 |
| WO | 9611218 | 4/1996 |
| WO | 9622995 | 8/1996 |
| WO | 9702298 | 1/1997 |
| WO | 9822486 | 5/1998 |
| WO | 9840374 | 9/1998 |
| WO | 9921899 | 5/1999 |
| WO | 9924446 | 5/1999 |
| WO | 9940129 | 8/1999 |
| WO | 9958539 | 11/1999 |
| WO | 0000517 | 1/2000 |
| WO | WO 00/08065 * | 2/2000 |
| WO | 0011057 | 3/2000 |
| WO | 0053646 | 9/2000 |
| WO | 0121674 | 3/2001 |

* cited by examiner

OTHER PUBLICATIONS

B.Small et al., "Highly Active Iron and Cobalt Catalysts for the Polymerization of Ethylene;" *J. Am. Chem. Soc.*; 120 (4049-4050) 1998.

*Primary Examiner*—Irina S. Zemel
(74) *Attorney, Agent, or Firm*—Jarrod N Raphael; William R Reid

(57) ABSTRACT

A process for preparing porous olefin polymers comprising bringing into contact in a polymerization reactor, at a temperature $T^1$, one or more olefins of the formula (I) $CH_2=CHR^1$, $R^1$ being hydrogen, a $C_1$–$C_{20}$-alkyl or a $C_6$–$C_{12}$-aryl group, with a catalyst obtained by reacting a solid catalyst component in the form of spheroidal particles comprising a compound of Ti or V not containing metal-$\pi$ bonds and a Mg halide, optionally containing one or more electron donor compounds, with an aluminum-alkyl (Al-alkyl) compound, then raising the temperature up to the polymerization temperature, said process being characterized in that: a) if the temperature $T^1$ is lower than 40° C., the temperature is raised up to the polymerization temperature is such a way that, for a time of at least one minute after the introduction temperature in such a way that, for a time of at least one minute after the introduction of the catalyst system into the reactor, the temperature of the reaction $T^2$ fulfills the following condition of formula (II) wherein m is the time expressed in minutes employed for reaching the temperature $T^2$; or b) if temperature $T^1$ is 40° C. or higher, the reactor is maintained for a time of at least one minute at a temperature of at least 40° C.

12 Claims, No Drawings

PROCESS FOR THE PREPARATION OF POROUS POLYMERS AND POLYMERS OBTAINABLE THEREOF

This application is the U.S. national phase of International Application PCT/EP01/15394, filed Dec. 21, 2001.

The present invention relates to a process for preparing olefin polymers, in particular homopolymers or copolymers of propylene, having high porosity and good pore size distribution. The present invention further relates to the use of said highly porous polymers as support for a catalyst component in a process for the polymerization of olefins and for the preparation of polymer reactor blends.

Catalysts comprising a transition metal supported on an inert inorganic carrier are well known for their use in the preparation of olefin polymers with morphological characteristics.

For instance, U.S. Pat. Nos. 4,298,718 and 4,399,054 describe catalysts of titanium halide supported on magnesium halide and their use in the polymerization of olefins.

In the European Patent Application EP 0 789 037 it is disclosed a polymerization process for the production of porous propylene polymers. Although the polymers obtained thereof have spherical particle form, the porosity of these polymers is still unsatisfactory.

Also known are catalysts for the polymerization of olefins wherein a transition metal is supported on an inert organic carrier.

For instance, EP-A-0 295 312 discloses catalysts of metallocenes supported on polymeric material for use in the polymerization of olefins. Although the obtained polymers have uniform particle size, the porosity values are not sufficiently high.

European Patent Applications EP 0 720 629 and EP 0 742 801 disclose a multistage process for the polymerization of olefins. In a first stage a polymer support is formed. In a second stage, the polymeric material previously formed is contacted with a metallocene compound. In a further stage, the polymerization is carried out in the presence of the supported polymer obtained in the previous steps. When said process is used for the preparation of heterophasic copolymers, such as rubbery copolymers, it is not satisfactory and can be improved so that less fouling occurs. Further, the proccessability of the obtained polymer can still be improved.

Thus, it would be desirable to provide porous polymers having improved porosity values and pore size distribution (P.S.D.) which, when used as carrier for a multistage process, avoid the above mentioned and other problems.

It has been surprisingly found that it is possible to obtain highly porous propylene polymers having improved pore size distribution in the form of spherical particles, which solve the above and other problems.

The present invention provides a process for preparing porous olefin polymers comprising putting into contact in a polymerization reactor, at a temperature $T^1$, one or more olefins of formula $CH_2=CHR^1$, $R^1$ being hydrogen, a $C_1$–$C_{20}$-alkyl or a $C_6$–$C_{12}$-aryl group with a catalyst obtained by reacting a solid catalyst component in the form of spheroidal particles comprising a compound of Ti or V not containing metal-π bonds and a Mg halide, optionally containing one or more electron donor compounds, with an aluminum-alkyl (Al-alkyl) compound, then raising the temperature up to the polymerization temperature, said process being characterized in that:

(I) if the temperature $T^1$ is lower than 40° C., the temperature is raised up to the polymerization temperature in such a way that, for a time of at least one minute after the introduction of the catalyst system into the reactor, the temperature of the reactor $T^2$ fulfills the following condition:

$$\frac{T^2 - T^1}{m} > 8$$

wherein m is the time expressed in minutes employed for reaching the temperature $T^2$; or (II) if the temperature $T^1$ is 40° C. or higher, the reactor is maintained for a time of at least one minute at a temperature of at least 40° C., preferably at a temperature higher than 45° C., more preferably at a temperature ranging from 45° C. to 65° C.

Preferably $T^1$ ranges from 28° C. to the polymerization temperature, preferably from 28° C. to 120° C., more preferably from 40° C. to 90° C.

Preferably in the condition (I) the polymerization temperature is reached in a time ranging from 1 to 10 minutes, more preferably from 2 to 6 minutes.

Preferably conditions (I) or (II) have to be fulfilled for 1 to 5 minutes, more preferably for at least 3 minutes.

Preferably in the condition (I)

$$\frac{T^2 - T^1}{m} > 9,$$

more preferably $$\frac{T^2 - T^1}{m} > 10;$$

still more preferably $$\frac{T^2 - T^1}{m} > 15;$$

even more preferably $$19 < \frac{T^2 - T^1}{m} < 25.$$

The catalyst system, either as such or together with a suitable hydrocarbon solvent, such as hexane or benzene, is added into the polymerization medium, which has the above mentioned temperature range. Subsequently, the temperature is varied according to the process of the present invention until the polymerization temperature is obtained.

The polymerization is carried out at a temperature ranging generally between 40° and 150° C., preferably between 60° C. and 90° C. The polymerization can be carried out at atmospheric pressure or higher.

The process of the invention can be carried out with low conversion degree, such that a prepolymer is obtained in an amount greater than 0.5 g per g of solid catalyst component and up to 2000 g per g of solid catalyst component.

Preferably, the amount is between 5 g and 500 g per g of catalyst component, and more preferably between 10 g and 100 g per g of catalyst component.

The prepolymerization is preferably carried out in a liquid phase containing an inert hydrocarbon diluent, such as propane or hexane or in gas phase.

Heterogeneous Ziegler/Natta solid catalyst components in the form of spherical particles are, for instance, obtained by supporting Ti or V compounds on Mg halide, preferably on active $MgCl_2$, which is in spherical form. Examples of these kind of catalysts are disclosed, for instance, in U.S. Pat. Nos. 4,399,054 and 5,221,651, the disclosure of which is incorporated herein by reference.

The catalyst component may also contain one or more electron-donors, either internal or external. An electron-donor is particularly useful when the catalyst is employed in the synthesis of stereoregular polymers of propylene and other alpha-olefins, such as 1-butene, where high stereospecificity is required to obtain polymers with an isotacticity index of greater than 90, or even greater than 98.

The electron-donor compound can be selected from ethers, esters, amines, ketones and the like. Non-limiting examples are alkyl esters, cycloalkyls and aryls of polycarboxylic acids, such as phthalic and maleic esters and ethers, such as those which are described in EP-A-45977, the disclosure of which is incorporated herein by reference. The external donor can be the same or can be different from the internal donor. A particularly preferred class of external donor comprises alkyl or alkoxy silanes of formula $R^{1b}_c R^{2b}_d Si(OR^{3b})_e$ wherein $R^{1b}$, $R^{2b}$ and $R^{3b}$ equal to or different from each other are $C_1$–$C_{20}$ hydrocarbon radical, c and d range from 0 to 2 being c+d equal to 1 or 2 and e is 2 or 3 being c+d+e=4. When using diether compounds as those as disclosed in the European patent application EP-A-361494, the stereospecificity of the catalyst is sufficiently high, such that the presence of an external-donor is not required.

The compounds of Ti or V are selected preferably from $TiCl_4$, $TiCl_3$ or $Ti(OR^2)_f X_{g-f}$ $R^2$ being a hydrocarbon radical containing up to 15 carbon atoms or a —$COR^3$ group, $R^3$ being a hydrocarbon radical containing up to 15 carbon atoms, X being a halogen, f ranges from 1 to 4 and g is the valence of titanium. Suitable vanadium based compounds are $VCl_3$, $VCl_4$, $VOCl_3$ and vanadyl halides. Most preferably, $TiCl_4$ or $TiCl_3$ is used.

The process for the preparation of the porous propylene polymers according to the present invention is also carried out in the presence of a co-catalyst, such as an aluminum-alkyl compound (Al-alkyl) compound. Non-limiting examples of aluminum compounds are $Al(Me)_3$, $Al(Et)_3$, $AlH(Et)_2$, $Al(iBu)_3$, $AlH(iBu)_2$, $Al(iHex)_3$, $Al(iOct)_3$, $AlH(iOct)_2$, $Al(C_6H_5)_3$, $Al(CH_2$—$CH(Me)CH(Me)_2)_3$, $Al(CH_2C_6H_5)_3$, $Al(CH_2CMe_3)_3$, $Al(CH_2SiMe_3)_3$, $Al(Me)_2iBu$, $Al(Me)_2Et$, $AlMe(Et)_2$, $AlMe(iBu)_2$, $Al(Me)_2iBu$, $Al(Me)_2Cl$, $Al(Et)_2Cl$, $AlEtCl_2$ and $Al_2(Et)_3Cl_3$, wherein Me=methyl, Et=ethyl, iBu=isobutyl, iHex=isohexyl, iOct=2,4,4-trimethyl-pentyl. The above mentioned Al-alkyl compounds can be used either alone or in mixtures thereof.

Amongst the above aluminum compounds, trimethylaluminum (TMA), triisobutylaluminum (TIBAL) and tris(2,4,4-trimethyl-pentyl)aluminum (TIOA) are preferred.

The catalytic component used in the process of the present invention is in the form of spherical particles having an average diameter between 10 and 150 μm. With the term spherical particles is meant particles having a ratio between maximum diameter and minimum diameter of less than 1.5 and preferably less than 1.3. Suitable methods for the preparation of said components in spherical form are described in U.S. Pat. Nos. 5,221,651 and 4,399,054.

A further aspect of the present invention is a polymer obtainable by a process according to the present invention as described above. Examples of olefins of formula $CH_2$=$CHR^1$ that can be polymerized according to the process of the present invention are ethylene, propylene, 1-butene, 1-pentene, 4-methyl-1-pentene, 1-hexene, 1-octene, 4,6-dimethyl-1-heptene. Preferred olefins are ethylene, propylene, 1-butene.

The present invention further provides polyolefins, and in particular propylene (pre)polymers optionally containing from 0.1 to 20% by moles of units deriving from an olefin of formula $CH_2$=$CHR^4$, $R^4$ being hydrogen, a $C_2$–$C_{20}$-alkyl or a $C_6$–$C_{12}$-aryl group, in the form of spherical particles, characterized in that said polymers have a porosity of greater than 0.54 cc/g (determined by mercury absorption) and a maximum of the pore size distribution curve greater than 10 μm.

Preferably, the porosity (determined by mercury absorption) is greater than 0.6 cc/g.

Preferably, the maximum of the pore size distribution curve is greater than 20 μm.

Preferably, the units deriving from an olefin are selected from the group consisting of ethylene, 1-butene and styrene, which can be employed either alone or in mixtures thereof.

Preferably the content by weight of units derived from $CH_2$=$CHR^4$ is less than 15%, most preferably less than 10%.

The olefin polymers obtained according to the process of the present invention can be chosen in view of its further use. It can be a propylene homopolymer preferably a crystalline or semi-crystalline propylene homopolymer having generally a high index of isotacticity. The index of isotacticity, expressed as mol % of isotactic pentads mmmm, is generally greater than 70, and can even reach values of greater than 90. Otherwise for particular applications a lower crystallinity is preferred.

Particularly, when using stereospecific catalysts, it is possible to obtain crystalline porous propylene homopolymers and propylene-ethylene copolymers. These polymers are characterized by very high porosity values, which render them very interesting for applications, such as the use as porous polymeric support for further polymerization processes or for the preparation of master-batches with pigments and/or other suitable additives.

Moreover, the porous polymers of propylene according to the present invention being in the form of spherical particles are endowed with very good morphological characteristics, such as high bulk density values, flowability and good mechanical resistance.

The average diameter of the polymeric particles is between 50 and 5000 μm.

The bulk density of the porous polymers of propylene according to the present invention is very low. Generally the bulk density of these porous polymers of propylene have values, which are inferior to 0.42 g/cc, preferably inferior to 0.350 g/cc and can even reach values of 0.26 g/cc.

The molecular weight of the porous polymers of propylene according to the present invention can vary over a wide range. Generally the intrinsic viscosity of the porous polymers of propylene according to the present invention is greater than 0.5 dl/g and can reach values of greater than 2.0 dl/g or even higher.

The polymer obtainable from the process of the present invention can be advantageously used as organic carrier for supporting a catalyst system for polymerizing alpha olefins of formula $CH_2=CH^1$, $R^1$ being hydrogen, a $C_1$–$C_{20}$-alkyl or a $C_6$–$C_{12}$-aryl group.

Therefore according to a still further aspect of the present invention a solid catalyst system is provided obtainable by contacting in any order:
i) a porous polymer obtained according to the process defined above;
ii) a suitable catalyst component and
iii) a suitable cocatalyst.

The reaction is preferably carried out in hydrocarbon solvents, such as hexane, heptane, toluene and the like at a temperature ranging from –20 to 120° C., preferably from 20° C. to 60° C.

Preferably the suitable catalyst component is contacted with a suitable cocatalyst and the mixture is contacted with the porous support described under i).

The compounds ii) and iii) that are not adsorbed on the porous carrier can be removed by washing methods or filtration.

The suitable catalyst component is preferably selected from compounds of a transition metal M selected from the Groups 3 to 10 of the Periodic Table of the Elements (new IUPAC version); preferred compounds of a transition metal are selected from the group consisting of:
(a) Compounds of Ti or V not containing Metal-π bond such as $TiCl¢_4$, $TiCl_3$ or $Ti(OR^2)_f X_{g-f}$, $R^2$ being a hydrocarbon radical containing up to 15 carbon atoms or a —$COR^3$ group, $R^3$ being a hydrocarbon radical containing up to 15 carbon atoms, X being a halogen and f ranges from 1 to 4 and g is the valence of titanium; or vanadium based compounds such as $VCl_3$, $VCl_4$, $VOCl_3$ and vanadyl halides. Most preferably, $TiCl_4$ or $TiCl_3$ is used.
(b) Compounds of transition metal M containing at least a M-π bond having the general formula (I):

$$QL_l ZMX^1_p \qquad (I)$$

wherein Q is selected from substituted or unsubstituted cyclopentadienyl radicals, which can carry one or more condensed cycles, which can contain one or more heteroatoms belonging to Groups 13–17 of the Periodic Table of the Elements to form for instance indenyl, tetrahydroindenyl, fluorenyl, octaidrofluorenyl, tetrahydrofluorenyl, indolyl, thiopenthyl, dithiophenecyclopentadienyl radical that can be substituted;

Z has the same meaning of Q or it can also be $=NR^6$, —O—, —S— and $=PR^6$, $R^6$ being selected from hydrogen, a $C_1$–$C_{20}$-alkyl, $C_3$–$C_{20}$-cycloallyl, $C_2$–$C_{20}$-alkenyl, $C_6$–$C_{20}$-aryl, $C_7$–$C_{20}$-alkylaryl or $C_7$–$C_{20}$-arylalkyl radical which can contains one or more heteroatoms belonging to Groups 13–17 of the Periodic Table of the Elements;

L is a divalent bridge connecting the moieties Q and Z; preferably L is selected from the group consisting of $C_1$–$C_{20}$-allylidene, $C_3$–$C_{20}$-cycloallylidene, $C_2$–$C_{20}$-alkenylidene, $C_6$–$C_{20}$-arylidene, $C_7$–$C_{20}$-alkylarylidene or $C_7$–$C_{20}$-arylakylidene radical which can contains one or more heteroatoms belonging to Groups 13–17 of the Periodic Table of the Elements; more preferably L is selected from the group consisting of $CR^8_2$, $C_2R^8_4$, $SiR^8_2$, $Si_2R^8_4$ o $CR^8_2SiR^8_2$ wherein $R^8$ is selected from the group consisting of hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical which can contains one or more heteroatoms belonging to groups 13–17 of the Periodic Table of the Elements; preferably $R^8$ is hydrogen, methyl, phenyl;

M is an atom of a transition metal M selected from the Groups 3 to 10 or the lanthamide or actinide groups of the Periodic Table of the Elements (new IUPAC version); preferably M is selected from the group consisting of Titanium, Zirconium and Hafnium;

$X^1$, same or different, is a ligand selected from hydrogen, a halogen, $R^9$, $OR^9$, $OSO_2CF_3$, $OCOR^9$, $SR^9$, $NR^9_2$ group, wherein $R^9$ is selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical, optionally containing one or more heteroatoms belonging to Groups 13–17 of the Periodic Table of the Elements;

p is an integer of from 0 to 3, preferably from 1 to 3, more preferably p is 2, being equal to the oxidation state of the metal M minus 2;

l is 0 or 1;

(c) late transition metal complex of formula (II) or (III):

$$L^a M^a X^a_p X^a_{s'} \qquad (II)$$

$$L^a M^a A^a \qquad (III)$$

wherein $M^a$ is a metal belonging to Group 8, 9, 10 or 11 of the Periodic Table of the Elements (new IUPAC notation);

$L^a$ is a bidentate or tridentate ligand of formula (VI):

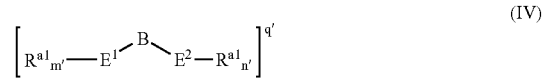

$$\left[ R^{a1}_{m'} - E^1 \overset{B}{\diagdown} E^2 - R^{a1}_{n'} \right]^{q'} \qquad (IV)$$

wherein:
B is a $C_1$–$C_{50}$ bridging group linking $E^1$ and $E^2$, optionally containing one or more atoms belonging to Groups 13–17 of the Periodic Table of the Elements;

$E^1$ and $E^2$, the same or different from each other, are elements belonging to Group 15 or 16 of the Periodic Table of the Element and are bonded to said metal $M^a$;

the substituents $R^{a1}$, the same or different from each other, are selected from the group consisting of hydrogen, linear or branched, saturated or unsaturated $C_1$–$C_{20}$ alkyl, $C_1$–$C_{20}$ alkyliden, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to Groups 13–17 of the Periodic Table of the Elements (such as B, Al, Si, Ge, N, P, O, S, F and Cl atoms); or two $R^{a1}$ substituents attached to the same atom $E^1$ or $E^2$ form a saturated, unsaturated or aromatic $C_4$–$C_8$ ring, having from 4 to 20 carbon atoms;

m' and n' are independently 0, 1 or 2, depending on the valence of $E^1$ and $E^2$, so to satisfy the valence number of $E^1$ and $E^2$; q' is the charge of the bidentate or tridentate ligand so that the oxidation state of $M^a X^a_p X^a_{s'}$ or $M^a A^a$ is satisfied, and the compound (II) or (III) is overall neutral;

$X^a$, the same or different from each other, are monoanionic sigma ligands selected from the group consisting of hydrogen, halogen, —R, —OR, —$OSO_2CF_3$, —OCOR, —SR, —$NR_2$ and —$PR_2$ groups, wherein the R substituents are linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing one or more atoms belonging to Groups 13–17 of the Periodic Table of the Elements (new IUPAC notation), such as B, N, P, Al, Si, Ge, O, S and F atoms; or two $X^a$ groups form a metallocycle ring containing from 3 to 20 carbon atoms; the substituents $X^a$ are preferably the same;

$X^{a'}$ is a coordinating ligand selected from mono-olefins and neutral Lewis bases wherein the coordinating atom is N, P, O or S;

p' is an integer ranging from 0 to 3, so that the final compound (II) or (III) is overall neutral;

s' ranges from 0 to 3 and $A^a$ is a π-allyl or a π-benzyl group.

Compounds belonging to group (a) are usually used in conjunction with Mg halides and with one or more electron donors as described above.

Non-limiting examples of compounds of transition metal M containing a M-π bond are those described in WO 98/22486, WO 99/58539 WO 99/24446, U.S. Pat. No. 5,556,928, WO 96/22995, EP-485822 and EP-485820.

Non limiting examples of late transition metal complexes are those described in WO 96/23010, WO 97/02298, WO 98/40374 and J. Am. Chem. Soc. 120:4049–4050, 1998.

The amount of the compound belonging to class (a) present in the porous polymer according to the present invention can in generally reach values between $1 \times 10^{-7}$ and $1 \times 10^{-1}\%$ by weight expressed as metal.

The amount of compounds of class (b) and class (c) present in the porous polymer according to the present invention is generally between $1 \times 10^{-7}$ and $1 \times 10^{-1}\%$ by weight expressed as metal. The amount is preferably between $1 \times 10^{-4}$ and $1 \times 10^{-2}\%$ by weight.

The suitable co-catalyst can be Al-alkyl compounds as described above, alumoxanes or a compound able of forming an alkylmetallocene cation. Preferably Al-alkyl compounds are used with compounds belonging to class (a), while alumoxanes or a compound able of forming an allcyl-metallocene cation are used with compounds belonging to class (b) and (c).

Alumoxanes can be obtained by reacting water with an organo-aluminum compound of formula $H_jAlR^5_{3-j}$ or $H_jAl_2R^5_{6-j}$, where $R^5$ substituents, same or different, are hydrogen atoms, $C_1$–$C_{20}$-alkyl, $C_3$–$C_{20}$-cyclalkyl, $C_6$–$C_{20}$-aryl, $C_7$–$C_{20}$-alkylaryl or $C_7$–$C_{20}$-arylalkyl, optionally contaning silicon or germanium atoms with the proviso that at least one $R^5$ is different from halogen, and j ranges from 0 to 1, being also a non-integer number. In this reaction the molar ratio of Al/water is preferably comprised between 1:1 and 100:1.

The molar ratio between aluminum and the metal of the metallocene is comprised between about 10:1 and about 20000:1, and more preferably between about 100:1 and about 5000:1.

The alumoxanes used in the catalyst according to the invention are considered to be linear, branched or cyclic compounds containing at least one group of the type:

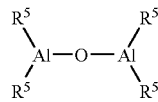

wherein the $R^5$ substituents, same or different, are described above.

In particular, alumoxanes of the formula:

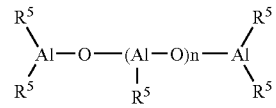

can be used in the case of linear compounds, wherein n is 0 or an integer from 1 to 40 and the $R^{15}$ substituents are defined as above, or alumoxanes of the formula:

can be used in the case of cyclic compounds, wherein n is an integer from 2 to 40 and the $R^5$ substituents are defined as above.

Examples of alumoxanes suitable for use according to the present invention are methylalumoxane (MAO), tetra-(isobutyl)alumoxane (TIBAO), tetra-(2,4,4-trimethylpentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in PCT/EP00/09111 in which the alkyl and aryl groups have specific branched patterns.

Non-limiting examples of aluminum compounds according to said PCT applications are:
tris(2,3,3-trimethyl-butyl)aluminum, tris(2,3-dimethyl-hexyl)aluminum, tris(2,3-dimethylbutyl)aluminum, tris(2,3-dimethyl-pentyl)aluminum, tris(2,3-dimethyl-heptyl)aluminum, tris(2-methyl-3-ethyl-pentyl)aluminum, tris(2-methyl-3-ethyl-hexyl)aluminum, tris(2-methyl-3-ethyl-hexyl)aluminum, tris(2-methyl-3-propyl-heptyl) aluminum, tris(2-ethyl-3-methyl-butyl)aluminum, tris(2-ethyl-3-methyl-pentyl)aluminum, tris(2,3-diethyl-pentyl) aluminum, tris(2-propyl-3-methyl-butyl)aluminum, tris (2-isopropyl-3-methyl-butyl)aluminum, tris(2- isobutyl-3-methyl -pentyl)aluminum, tris(2,3,3-trimethyl-pentyl) aluminum, tris(2,3,3-trimethylhexyl)aluminum, tris(2-ethyl-3,3-dimethyl-butyl)aluminum, tris(2-ethyl-3,3-dimethylpentyl)aluminumn, tris(2-isopropyl-3,3-dimethyl-butyl)aluminum, tris(2-trimethylsilylpropyl) aluminum, tris(2-methyl-3-phenyl-butyl)aluminum, tris (2-ethyl-3-phenylbutyl)aluminum, tris(2,3-dimethyl-3-phenyl-butyl)aluminum, tris(2-phenyl-propyl)aluminum, tris[2-(4-fluoro-phenyl)-propyl]aluminum, tris[2-(4-chloro-phenyl)-propyl]aluminumn, tris[2-(3 isopropyl-phenyl)-propyl]aluminum, tris(2-phenyl-butyl)aluminum, tris(3-methyl-2-phenylbutyl)aluminum, tris(2-phenyl-pentyl)aluminum, tris[2-(pentafluorophenyl)-propyl]aluminum, tris[2,2-diphenyl-ethyl]aluminum and tris[2-phenyl-2-methyl-propyl]aluminum, as well as the corresponding compounds wherein one of the hydrocarbyl groups is replaced by an hydrogen atom, and those wherein one or two of the hydrocarbyl groups are replaced by an isobutyl group.

Amongst the above aluminum compounds, trimethylalumnum (TMA), triisobutylaluminum (TIBAL), tris(2,4,4-trimethyl-pentyl)aluminum (TIOA), tris(2,3-dimethylbutyl) aluminum (TDMBA) and tris(2,3,3-trimethylbutyl) aluminum (TTMBA) are preferred.

The molar ratio between the aluminum and the metal of the metallocene compound is in general comprised between 10:1 and 20000:1, and preferably between 100:1 and 5000:1.

Non-limiting examples of compounds able to form an alkylmetallocene cation are compounds of formula $D^+E^-$, wherein $D^+$ is a Brønsted acid, able to give a proton and to react irreversibly with a non π substituent of the metallocene compound and $E^-$ is a compatible anion, which is able to stabilize the active catalytic species originating from the reaction of the two compounds, and which is sufficiently labile to be able to be removed by an olefinic monomer. Preferably, the anion $E^-$ consists of one or more boron atoms. More preferably, the anion $E^-$ is an anion of formula $BAr_4^{(-)}$, wherein the substituents Ar which can be identical or different are aryl radicals such as phenyl, pentafluorophenyl or bis(trfluoromethyl)phenyl. Tetrakis-pentafluorophenyl borate is particularly preferred. Moreover, compounds of formula $BAr_3$ can conveniently be used. Compounds of this type are described, for example, in the published International patent application WO 92/00333, the content of which is incorporated in the present description.

Further, compounds of formula $R^7M^1$—O—$M^1R^7$, $R^7$ being an alkyl or aryl group, and $M^1$ is selected from an element of the Group 13 of the Periodic Table of the Elements (new IUPAC version). Compounds of this type are described, for example, in the International patent application WO 99/40129.

The metallocene compounds (class (b)) or late transition metal complexes (class (c)) can be supported by using solution thereof in a hydrocarbon solvent, such as hexane, benzene, toluene and the like. This solution can also contain a co-catalyst, for instance, a trialkyl-Al compound, such as triisobutyl-Al, triethyl-Al and/or polyaluminoxane such as methylalumoxane. The molar ratio between the alkyl-Al compound and the metallocene compound is generally greater than 2 and preferably between 5 and 5000, more preferably between 5 and 1000.

Preferably, the cocatalyst is alumoxane and/or a compound capable of forming an alkyl metallocene cation.

The process of the present invention can be also used as first step of a multistep process such as that described in WO 96/11218, WO 96/2583, WO 00/11057 and WO 00/53646. In this process the polymer prepared according to the process of the present invention is impregnated with a metallocene compound or a late transition metal complex and with a suitable co-catalyst as defined above and then one or more olefins are polymerized. The polymer of the first steps range from 10% to 70% by weight of the total polymer obtained in the multistep process, preferably from 10% to 60% by weight, more preferably from 20% to 50% by weight.

Thus, a still further aspect of the present invention is a process for the polymerization of one or more olefins of formula $CH_2=CHR^1$, $R^1$ being hydrogen, a $C_1-C_{20}$-allyl or a $C_{6-12}$-aryl group, comprising the following steps:

(A) polymerizing said olefin $CH_2=CHR^1$, in one or more reactors, according to the process of the present invention, in order to obtain a porous polymeric polymer as defined above;

(B) optionally deactivating the catalyst used under (A) and contacting the product as obtained under step (A) with a suitable catalyst component selected from the groups (a), (b) or (c) described above and optionally an Al-alkyl compound or an alumoxane or a compound capable of forming an alkyl metallocene cation;

(C) polymerizing one or more of said olefins $CH_2=CHR^1$, in one or more reactors, in the presence of the product obtained in step (B).

Preferably in step (B) compounds selected from group (b) or (c) are used. Preferably in step (B) the catalyst used under (A) is deactivated.

The highly porous polymers obtained in above step (A) are particularly useful as porous polymeric support containing a significant amount of a second catalyst system as described in above step (B). The thus obtained polymeric porous support is particularly useful in the subsequent polymerization stage (C). A particular advantage of the highly porous polymers of the present invention is their use in the preparation of rubber-like copolymers. The high porosity of said porous polymers as prepared in step (A) makes it possible to work in the gas phase without particular problems, favoring good activities together with low fouling.

The amount of the highly porous polymer according to the present invention in step (A) is generally greater than 2000 g/g of solid component, preferably greater than 3000 g/g, and more preferably greater than 5000 g/g.

Preferably, the solid component used in step (A) is in the form of spherical particles having an average diameter of between 10 and 150 μm.

Preferably, in the product obtained from step (B), the compound selected from the groups (a), (b) or (c) is present in a quantity of between $1 \times 10^{-7}$ and $1 \times 10^{-3}$% by weight expressed as metal.

The deactivating step, if any, of the catalyst used in (A) prior to the contact treatment with the metallocene is carried out with a compound that is capable of deactivating the catalyst present in the product obtained in step (A).

Preferably the compound that is capable of deactivating the catalyst is selected from the group consisting of CO, COS, $CS_2$, $CO_2$, $O_2$, acetylenic compounds, allenic compounds and compounds of general formula $R^{10}_{y-1}X^2H$ in which $R^{10}$ is hydrogen or a hydrocarbon group with from 1 to 10 carbon atoms, $X^2$ is oxygen, nitrogen or sulfur and y is the valence of $X^2$.

Non-limiting examples of compounds for use as a deactivating agent can be found in U.S. Pat. No. 5,648,422, the disclosure of which being incorporated herein by reference.

Preferably, the step (A) is carried out in liquid phase in the presence of an organic solvent or in gas phase and the step (C) is carried out in the gas phase in at least one reactor with a fluidized bed or a mechanically-stirred bed.

More preferably, both steps (A) and (C) are carried out in the gas phase with a fluidized bed or a mechanically stirred bed.

Preferably, the step (B) is carried out in the gas phase.

The process of the invention can be used for a wide range of olefin polymer compositions. The process of the invention is particularly suitable for the preparation of heterophase copolymers of propylene, from high-impact polypropylene to thermoplastic elastomers.

Thus, a still further aspect of the present invention is a process for the preparation of heterophase copolymers of propylene comprising the following steps:

(A) polymerizing, in at least one reactor, propylene or its mixtures with one or more olefins $CH_2=CHR^4$, $R^4$ being hydrogen, a $C_2-C_{20}$-alkyl or a $C_6-C_{12}$-aryl group, according to the process of the present invention, said polymer having a content of units derived from the ethylene or the olefin of less than 20% by weight and a content of units derived from the propylene of greater than 80% by weight;

(B) optionally deactivating the catalyst used under (A) and contacting the product as obtained under step (A) with a compound selected from the groups (a), (b) or (c) described above and optionally an Al-alkyl compound or an alumoxane or a compound capable of forming an alkyl metallocene cation;

(C) polymerizing, in at least one reactor at least two olefins selected from those belonging to formula $CH_2=CHR^1$, $R^1$ being described above and optionally a polyene, in the presence of a product obtained under step (B).

The polymer produced in step (A) is preferably a highly porous homopolymer of propylene having high isotacticity or a highly copolymer of propylene having a content by weight of units derived from ethylene and/or from an olefin $CH_2=CHR^4$, $R^4$ being defined as above, less than 10% by mol.

Non-limiting examples of copolymers obtained in step (C) of the process of the present invention are elastomeric copolymers of ethylene and propylene i.e. ethylene and propylene monomers are polymerized or elastomeric terpolymers of ethylene and propylene containing minor amounts of polyene i.e. ethylene, propylene and a polyene monomers are polymerized. The polyenes that can be used as comonomers in the copolymers according to the present invention are comprised in the following classes:

non-conjugated diolefins able to cyclopolymerize such as, for example, 1,5-hexadiene, 1-6-heptadiene, 2-methyl-1,5-hexadiene;

dienes capable of giving unsaturated monomeric units, in particular conjugated dienes such as, for example, butadiene and isoprene, and linear non-conjugated dienes, such as, for example, trans 1,4-hexadiene, cis 1,4-hexadiene, 6-methyl-1,5-heptadiene, 3,7-dimethyl-1,6-octadiene, 11-methyl-1,10-dodecadiene, and cyclic non-conjugated dienes such as 5-ethylidene-2-norbornene.

A preferred polyene for use in the copolymers of the invention is 5-ethylidene-2-norbornene (ENB).

The content of units derived from ethylene is between about 20 and 80% by mol, preferably 30 and 70% by mol. The content of polyene derived units, if any, is preferably comprised between 0.1% and 30% by mol and, more preferably between 0.1% and 20% by mol.

The polymers obtained in step (C) of the process of the present invention can be substantially amorphous, elastomeric, flexible or crystalline.

A particular advantage of porous polymer according to the present invention is that a very high amount of elastomeric copolymer obtained in above step (C) of the process according to the present invention can be combined with said porous polymer of step (A), without incurring major problems in the polymerization process, such as fouling. Thus, the amount of the polymer produced in stage (C) is preferably between 10% and 90%, more preferably between 50% and 80%, relative to the amount of polymer produced in stage (A).

A further advantage, alongside to the very good processability, of the process according to the present invention is that the use of the porous polymers enables the preparation of polymeric compositions in very good yield and enhanced quality.

Preferably the olefin used as comonomer in step (C) is selected from ethylene, 1-butene, styrene.

The process of the present invention is preferably carried out in continuos mode. Both polymerization steps described in (A) and (C) are preferably carried out in the gas phase in the presence of a fluidized-bed reactor, treatment step (B) being carried out in the gas phase.

The polymerization step (C) can also be carried out in suspension, in solution, emulsion or in gas-phase with a mechanically stirred bed. The first polymerization stage (A) is preferably carried out such that a prepolymer of propylene or its mixtures with ethylene and/or an olefin $CH_2=CHR^1$, $R^1$ being defined as above, is formed in the presence of the catalyst as mentioned in above step (A). The prepolymer is generally formed in a quantity of between 5 and 5000 g/g of catalyst. The prepolymerization can be carried out in liquid propylene in the presence of an inert hydrocarbon solvent, such as hexane or benzene.

The advantages of the process according to the present invention are found both in the quality of the final product and in the flexibility of the process.

When the porous polymer obtained according to the present invention is used as support or when the process of the present invention is used as first step of a multi-step process as above described it is possible to enhance both the characteristic of the process and the feature of the final polymer obtained. The enhanced porosity of the polymer of the present invention permits to obtain supported or impregnated catalyst system with high activity. Moreover it is possible to reduce the fouling of the process when the polymer of the present invention is used as support enhancing at the same time the morphology of the final polymer.

The following examples are given solely for illustrative purpose and are not intended to limit the scope of the present invention.

General Procedures

The data reported in the Examples relative to the properties of the porous polymers of the present invention were determined according to the methods indicated below.

MIL flow index: ASTM-D1238.

Intrinsic viscosity (I.V.): measured in tetrahydronaphtalene (THN) at 135° C.

Fraction soluble in xylene: 2 g of polymer were dissolved in 250 ml of xylene at 135° C. under stirring. After 20 minutes the solution was left to cool, still under stirring, up to 25° C. After 30 minutes the precipitated material was filtered through filter paper, the solution was evaporated in nitrogen current and the residual was dried under vacuum at 80° C. until it reached constant weight. Thus, the percentage of polymer soluble in xylene at room temperature was calculated.

Porosity (mercury) is determined by immersing a known quantity of the sample in a known quantity of mercury inside a dilatometer and gradually hydraulically increasing the pressure of the mercury. The pressure of introduction of the mercury in the pores is in function of the diameter of the same. The measurement was carried out using a porosimeter "Porosimeter 2000 Series" (Carlo Erba). The total porosity was calculated from the volume decrease of the mercury and the values of the pressure applied.

The porosity expressed as percentage of voids is determined by absorption of mercury under pressure. The volume of mercury absorbed corresponds to the volume of the pores. For this determination, a calibrated dilatometer (diameter 3 mm) CD3 (Carlo Erba) connected to a reservoir of mercury and to a high-vacuum pump ($1\times10^{-2}$ mbar) is used. A weighed amoumt of sample (about 0.5 g) is placed in the dilatometer. The apparatus is then placed under high vacuum (<0.1 mm Hg) and is maintained in these conditions for 10 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and the apparatus is pressurized with nitrogen (2.5 Kg/cm$^2$). Under the effect of the pressure, the mercury penetrates into the pores and the level goes down according to the porosity of the material. Once the level at which the mercury has stabilized has been measured on the dilatometer, the volume of the pores is calculated from the equation V=R2πΔH, where R is the radius of the dilatometer and ΔH is the difference in cm between the initial and the final levels of the mercury in the dilatometer. By weighting the dilatometer, dilatometer+mercury, dilatometer+mercury+sample, the value of the apparent volume $V_1$ of the sample prior to penetration of the pores can be calculated.

The volume of the sample is given by:

$$V_1 = [P_1 - (P_2 - P)]/D$$

P is the weight of the sample in grams, $P_1$ is the weight of the dilameter+mercury in grams, $P_2$ is the weight of the dilatometer+mercury+sample in grams, D is the density of mercury (at 25° C.=13.546 g/cc). The percentage porosity is given by the relation:

$$X = (100 V)V_1.$$

The pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

Bulk density: DIN-53194.
Morphology: ASTM-D1921-63.

EXAMPLES

Preparation of MgCl$_2$/alcohol Adducts

The MgCl$_2$/alcohol adducts in spherical particle form were prepared following the method described in Example 2 of U.S. Pat. No. 4,399,054, but operating at 5,000 rpm instead of 10,000 rpm. The adduct was partially dealcoholated by heating at temperatures from 50° to 100° C., under a nitrogen stream until the desired alcohol content was obtained according to the description of EP 0 395 083.

Preparation of the Catalysts

The catalyst used in Examples 1 to 6 were prepared following the general method described in EP 0 395 083 by using an adduct with a content of alcohol of 50% wt for the catalyst used in Examples 1 and 2, and 35% wt for the catalyst used in Examples 3 to 6.

Example 1 (Comparative Example)

A MgCl$_2$.3C$_2$H$_5$OH adduct in spherical particle form which particles have a diameter from 30 to 150 microns was prepared following the method described in Example 2 of U.S. Pat. No. 4,399,054, the disclosure of said method being incorporated herein by reference, operating at 5,000 rpm instead of 10,000 rpm. The resultant adduct is then dealcoholated by heating with temperatures increasing from 50° to 100° C., under a nitrogen stream until the alcohol content reaches 50 wt %.

The solid obtained was used in order to prepare the catalyst following the procedure described in EP 0 395 083.

The polymerisation reaction was carried out following the procedure described in EP 0 395 083 as follows.

Using 0.011 g of the solid component, a propylene polymerisation was carried out in a 4 l autoclave equipped with magnetically driven stirrer and a thermostatic system, previously fluxed with nitrogen at 70° C. for one hour and then with propylene. Into the reactor at 30° C., without stirring but under propylene stream, a catalyst system consisting of a suspension of the solid component in 15 ml of hexane, 1.14 g of triethylaluminum, and 114 mg of dicyclopentyldimethoxysilane is introduced, this system is prepared just prior to its use in the polymerisation test.

The autoclave is then closed and 3.5 l of hydrogen are introduced. Under stirring, 1.3 Kg of propylene was charged and the temperature was brought to 70° C. in 5 minutes, maintaining the value constant for two hours. At the end of the test, the stirring was stopped and the unreacted propylene was vented off. After cooling the autoclave to room temperature, the polymer is recovered and then dried at 70° C. under a nitrogen stream in an oven for 3 hours. 560 g of spherical polymer are obtained having the following characteristics:
fraction soluble in xylene=1.5%
I.V.=2.02 dl/g
Bulk density=0.466 g/cc
Void percentage=10.2

The characteristics of the obtained polymer are reported in Table 1.

Example 2

The autoclave of Example 1 was equipped with a 50-ml stainless steel vial connected on the bottom of the reactor. The autoclave was closed in propylene atmosphere and 3 l of hydrogen and 1300 g of propylene was introduced under stirring. The temperature was raised at 50° C., and an hexane suspension of the catalyst system containing 0.0095 g of the catalyst component of Example 1 and the others ingredients as described in Example 1, were injected, under nitrogen pressure and through the stainless steel vial, into the autoclave. The temperature was kept constant at 50° C. for 5 minutes, then was raised at 70° C. in 5 minutes.

The polymerization is carried out at the same temperature for a total period of time of 2 hours.

Then according to the procedure of Example 1, 390 g of a spherical polymer are obtained, having the following characteristics:
fraction soluble in xylene=1.8%
I.V.=2.10 dl/g
Bulk density=0.418 g/cc
Void percentage=19.2

The characteristics of the obtained polymer are reported in Table 1.

Example 3 (Comparative Example)

According to the above Example 1 a catalyst component in spherical form was prepared by partially dealcoholising a MgCl$_2$.3EtOH adduct, until a residual content of 35 wt % was obtained. Using 0.019 g of this catalyst component in the propylene polymerisation according to the procedure of Example 1 (3 l of hydrogen instead of 3.5 l were used), 418 g of spherical polymer are obtained having the following characteristics:
fraction soluble in xylene=3.4%
I.V.=1.9 dl/g
Bulk density=0.350 g/cc
Void percentage=32.6

The characteristics of the obtained polymer are reported in Table 1.

Example 4

Using 0.022 g of the catalyst component of Example 3, and according to the ingredients and the propylene polymerization procedure of Example 1, except that for the time requested to raise the temperature of the autoclave, i.e. from 30° C. to 70° C., were 2 minutes, instead of 5 minutes. 440 g of spherical polymer were obtained having the following characteristics:
fraction soluble in xylene=3.5%
I.V.=1.68 dl/g
Bulk density=0.288 g/cc
Void percentage=35.1
The characteristics of the obtained polymer are reported in Table 1.

Example 5

Using 0.02 g of the catalyst component of Example 3, and according to the ingredients and the propylene polymerization procedure of Example 2 (but for the amount of hydrogen reduced at 2.5 l) and injecting the catalytic suspension at 55° C., instead of 50° C., and then keeping the temperature constant at 55° C. for 5 minutes, 280 g of spherical polymer were obtained having the following characteristics:
fraction soluble in xylene=3.6 wt %
I.V.=1.47 dl/g
Bulk density=0.261 g/cc
Void percentage=39.5
The characteristics of the obtained polymer are reported in Table 1.

Example 6

The autoclave of Example 1 was equipped with a 50-ml stainless steel vial connected on the bottom of the reactor and the stirring was provided by a custom ribbon type stirrer and variable speed. The autoclave was closed in propylene atmosphere and 3.3 l of hydrogen and 600 g of propylene are introduced, under stirring at 600 rpm. Then the temperature was raised at 50° C., and 15 ml of an hexane suspension of the catalyst system containing 0.045 g of catalyst component of Example 3, 0.912 g of triethylaluminum and 182 mg of dicyclopentyldimethoxysilane, were injected, under nitrogen pressure, into the autoclave by the stainless steel vial.

The temperature was kept constant at 50° C. for 5 minutes, then the stirring was stopped and the unreacted propylene was vented off. As a consequence, the temperature decreased at 30° C. Then, under stirring at 300 rpm, 207 g of propylene were introduced into the reactor in 8 minutes and, at the same time, the temperature was raised at 75° C. and 3.4 l of hydrogen, were charged by a pressurized cylinder. The temperature was kept constant and in order to maintain constant the pressure at 24 bar-g, 220 g of propylene were fed during a polymerization time of 30 minutes.

The stirring was stopped and the autoclave was vented and cooled at room temperature. 328 g of a spherical polymer were obtained having the following characteristics:
fraction soluble in xylene=3.10 wt %
I.V.=1.81 dl/g
Bulk density=0.264 g/cc
Void percentage=41.6
The characteristics of the obtained polymer are reported in Table 1.

Example 7 (Comparative Example)

A catalyst component was prepared according to the procedure as described in Example 1 of U.S. Pat. No. 4,220,554, except that, instead of benzoyl chloride, diisobutylphthalate (DIBP) was used. Using 0.009 g of this catalyst component in the propylene polymerisation according to the procedure and the ingredients of Example 1, 330 g of granular polymer (flakes) were obtained having the following characteristics:
fraction soluble in xylene=1.4%
I.V.=1.95 dl/g
Bulk density=0.499 g/cc
Void percentage=8.7
The characteristics of the obtained polymer are reported in Table 1.

Example 8

Using 0.019 g of the catalyst component of Example 7 and according to the ingredients and the propylene polymerization procedure of Example 5 and injecting the catalytic suspension at 55° C. and then keeping the temperature constant at 55° C. for 5 minutes, 280 g of granular polymer (flakes) were obtained having the following characteristics:
fraction soluble in xylene=1.5 wt %
I.V.=2.1 dl/g
Bulk density=0,400 g/cc
Void percentage=18.8
The characteristics of the obtained polymer are reported in Table 1.

Example 9

The example 5 was repeated, except that 0.031 g of the catalyst component and ethylene and propylene were used.
1.3 kg of propylene and 26 g of ethylene and 3 l of hydrogen were introduced into the reactor. The catalytic components were injected into the reaction medium heated at 50° C. The temperature was kept constant for 5 minutes, then raised at 70° C. and kept constant for 39 minutes while feeding 30 g of ethylene, in order to maintain a constant pressure of 31 bar-g. 216 g of copolymer were obtained having the following characteristics:
I.V.=2.5 dl/g
Ethylene content=8.6 wt %
Bulk density=0.250 g/cc
Void percentage=27.9
The characteristics of the obtained polymer are reported in Table 1.

TABLE 1

| Ex | Catalyst mg | PP g | I.V. dl/g | Bulk density g/cc | Surface Area m²/g | Pore volume cc/g | Porosity in % of voids | Average radius μm | P.S.D. (μm; peak maximum) |
|---|---|---|---|---|---|---|---|---|---|
| 1# | 11 | 560 | 2.02 | 0.466 | 0.1 | 0.131 | 10.2 | 10.9 | n.a. |
| 2 | 9.5 | 390 | 2.10 | 0.418 | 0.4 | 0.265 | 19.2 | 12.4 | n.a. |
| 3# | 19 | 418 | 1.9 | 0.350 | 0.7 | 0.538 | 32.6 | 8.7 | 6.8 |
| 4 | 22 | 440 | 1.68 | 0.288 | 0.4 | 0.668 | 35.1 | 14.9 | 27 |
| 5 | 20 | 280 | 1.47 | 0.261 | 0.3 | 0.763 | 39.5 | 15.9 | 38 |
| 6 | 45 | 328 | 1.81 | 0.264 | 0.5 | 0.853 | 41.6 | 14.1 | 30 |
| 7# | 9 | 330 | 1.95 | 0.499 | 0.2 | 0.107 | 8.7 | 24.9 | n.a. |

TABLE 1-continued

| Ex | Catalyst mg | PP g | I.V. dl/g | Bulk density g/cc | Surface Area m²/g | Pore volume cc/g | Porosity in % of voids | Average radius μm | P.S.D. (μm; peak maximum) |
|---|---|---|---|---|---|---|---|---|---|
| 8 | 19 | 280 | 2.1 | 0.400 | 0.2 | 0.256 | 18.8 | 19.0 | n.a. |
| 9 | 31 | 216* | 2.5 | 0.250 | 1.0 | 0.464 | 27.9 | 19.5 | n.a. |

P.S.D.: pore size distribution
n.a.: not available
*propylene-ethylene copolymer
comparative

What is claimed is:

1. A process for preparing porous olefin polymers, having a porosity of greater than 0.54 cc/g, comprising putting into contact in a polymerization reactor having a reactor temperature initially at a temperature $T^1$, one or more olefins of formula $CH_2=CHR^1$, $R^1$ being hydrogen, a $C_1$–$C_{20}$-alkyl or a $C_6$–$C_{12}$-aryl group with a catalyst obtained by reacting a solid catalyst component in the form of spheroidal particles comprising a compound of Ti or V not containing metal -π bonds and a Mg halide, optionally containing one or more electron donor compounds, with an aluminum-alkyl (Al-alkyl) compound, then raising the reactor temperature up to a polymerization temperature, wherein (I) if the temperature $T^1$ is lower than 40° C., the reactor temperature is raised up to the polymerization temperature in such a way that, for a time of at least one minute after the introduction of the catalyst system into the reactor, the reactor temperature is raised up to $T^2$ under the following condition:

$$\frac{T^2 - T^1}{m} > 10$$

wherein m is the time, expressed in minutes, employed for reaching the temperature $T^2$; or (II) if the temperature $T^1$ is 40° C. or higher, the reactor temperature is maintained for a time of at least one minute at a temperature ranging from 45° C. to 65° C., wherein the process produces at least about 500 grams of the porous olefin polymers per gram of the solid catalyst component.

2. The process according to claim 1 wherein $T^1$ ranges from 28° C. to the polymerization temperature.

3. The process according to claim 1 wherein m is between 1 and 5 minutes.

4. The process according to claim 1 wherein polymerization is carried out at a temperature ranging generally between 40° and 150° C.

5. The process of claim 1 wherein under (II) the reactor temperature is maintained for a time of between 1 and 5 minutes at a temperature ranging from 45° C. to 65° C.

6. A solid catalyst system obtained by contacting in any order:

(A) a porous polymer, having a porosity of greater than 0.54 cc/g, obtained in a process comprising putting into contact in a polymerization reactor having a reactor temperature initially at a temperature $T^1$, one or more olefins of formula $CH_2=CHR^1$, $R^1$ being hydrogen, a $C_1$–$C_{20}$-alkyl or a $C_6$–$C_{12}$-aryl group with a catalyst obtained by reacting the solid catalyst component in the form of spheroidal particles comprising a compound of Ti or V not containing metal-π bonds and a Mg halide, optionally containing one or more electron donor compounds, with an aluminum-alkyl (Al-alkyl) compound, then raising the reactor temperature up to a polymerization temperature, wherein (I) if the temperature $T^1$ is lower than 40° C., the reactor temperature is raised up to the polymerization temperature in such a way that, for a time of at least one minute after the introduction of the catalyst system into the reactor, the reactor temperature is raised up to $T_2$ under the following condition:

$$\frac{T^2 - T^1}{m} > 10$$

wherein m is the time, expressed in minutes, employed for reaching the temperature $T^2$; or (II) if the temperature $T^1$ is 40° C. or higher, the reactor is maintained for a time of at least one minute at a temperature ranging from 45° C. to 65° C.;

(B) a suitable catalyst component; and
(C) a suitable cocatalyst, wherein the solid catalyst system produces the porous polymer in a ratio of at least about one gram to about 500 grams.

7. The solid catalyst system according to claim 6 wherein the suitable catalyst component is selected from compounds of a transition metal M selected from the Groups 3 to 10 of the Periodic Table of the Elements (new IUPAC version).

8. The solid catalyst system according to claim 7 wherein the suitable catalyst component is selected from the group consisting of:

(a) compounds of Ti or V not containing a metal-π bond;
(b) compounds of transition metal M containing at least a M-π bond having a general formula (I)

$$QL_lZMX^1_p \qquad (I)$$

wherein Q is selected from substituted or unsubstituted cyclopentadienyl radicals, which can carry one or more condensed cycles, which can contain one or more heteroatoms belonging to Groups 13–17 of the Periodic Table of the Elements;

Z has the same meaning of Q or it can also be $=NR^6$, —O—, —S— and $=PR^6$, $R^6$ being selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical which can contain one or more heteroatoms belonging to Groups 13–17 of the Periodic Table of the Elements;

L is a divalent bridge connecting the moieties Q and Z; M is an atom of transition metal selected from the Groups 3 to 10 or the lanthanide or actinide groups of the Periodic Table of the Elements (new IUPAC version);

$X^1$, same or different, is a ligand selected from hydrogen, a halogen, $R^9$, $OR^9$, $OSO_2CF_3$, $OCOR^9$, $SR^9$, $NR^9_2$ or $PR^9_2$ group, wherein $R^9$ is selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical, optionally containing one or more heteroatoms belonging to Groups 13–17 of the Periodic Table of the Elements;

p is an integer of from 0 to 3;

l is 0 or 1; and (c) a late transition metal complex of formula (II) or (III):

wherein $M^a$ is a metal belonging to Group 8, 9, 10 or 11 of the Periodic Table of the Elements (new IUPAC notation);

$L^a$ is a bidentate or tridentate ligand of formula (VI):

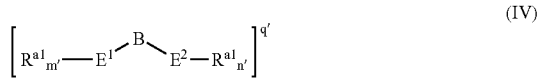

wherein:

B is a $C_1$–$C_{50}$ bridging group linking $E^1$ and $E^2$, optionally containing one or more atoms belonging to Groups 13–17 of the Periodic Table;

$E^1$ and $E^2$, the same or different from each other, are elements belonging to Group 15 or 16 of the Periodic Table and are bonded to said metal $M^a$;

the substituents $R^{a1}$, the same or different from each other, are selected from the group consisting of hydrogen, linear or branched, saturated or unsaturated $C_1$–$C_{20}$ alkyl, $C_1$–$C_{20}$ alkyliden, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to Groups 13–17 of the Periodic Table of the Elements; or two $R^{a1}$ substituents attached to the same atom $E^1$ or $E^2$ form a saturated, unsaturated or aromatic $C_4$–$C_8$ ring, having from 4 to 20 carbon atoms;

m' and n' are independently 0, 1 or 2, depending on the valence of $E^1$ and $E^2$, so to satisfy the valence number of $E^1$ and $E^2$; q' is the charge of the bidentate or tridentate ligand so that the oxidation state of $M^a X^a_p X^{a'}_s$ or $M^a A^a$ is satisfied, and the compound (II) or (III) is overall neutral;

$X^a$, the same or different from each other, are monoanionic sigma ligands selected from the group consisting of hydrogen, halogen, —R, —OR, —$OSO_2CF_3$, —OCOR, —SR, —$NR_2$ and —$PR_2$ groups, wherein the R substituents are linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing one or more atoms belonging to Groups 13–17 of the Periodic Table of the Elements (new IUPAC notation), or two $X^a$ groups form a metallocycle ring containing from 3 to 20 carbon atoms;

$X^{a'}$ is a coordinating ligand selected from mono-olefins and neutral Lewis bases wherein the coordinating atom is N, P, O or S;

p' is an integer ranging from 0 to 3, so that the final compound (II) or (III) is overall neutral; s' ranges from 0 to 3; and $A^a$ is a π-allyl or a π-benzyl group.

9. The solid catalyst system according to claim 6 wherein the suitable co-catalyst comprises at least one of Al-alkyl compounds, alumoxanes and a compound that forms an alkylmetallocene cation.

10. A process for polymerization of one or more olefins of formula $CH_2$=$CHR^1$, $R^1$ being hydrogen, a $C_1$–$C_{20}$-alkyl or a $C_6$–$C_{12}$-aryl group, comprising the following steps:

(A) polymerizing said olefin $CH_2$=$CHR^1$, in one or more reactors, by a process comprising putting into contact in a polymerization reactor having a reactor temperature initially at a temperature $T^1$, one or more olefins of formula $CH_2$=$CHR^1$, $R^1$ being hydrogen, a $C_1$–$C_{20}$-alkyl or a $C_6$–$C_{12}$-aryl group with a catalyst obtained by reacting a solid catalyst component in the form of spheroidal particles comprising a compound of Ti or V not containing metal-π bonds and a Mg halide, optionally containing one or more electron donor compounds, with an aluminum-alkyl (Al-alkyl) compound, then raising the reactor temperature up to a polymerization temperature, wherein (I) if the temperature $T^1$ is lower than 40° C., the reactor temperature is raised up to the polymerization temperature in such a way that, for a time of at least one minute after the introduction of the catalyst system into the reactor, the reactor temperature is raised up to $T^2$ under the following condition:

$$\frac{T^2 - T^1}{m} > 10$$

wherein m is the time, expressed in minutes, employed for reaching the temperature $T^2$; or (II) if the temperature $T^1$ is 40° C. or higher, the reactor is maintained for a time of at least one minute at a temperature ranging from 45° C. to 65° C.;

(B) optionally deactivating the catalyst used under (A) and contacting the product as obtained under step (A) with a catalyst component selected from the group consisting of:

(a) compounds of Ti or V not containing a metal-π bond;

(b) compounds of transition metal M containing at least a M-π bond having a general formula (I):

wherein Q is selected from substituted or unsubstituted cyclopentadienyl radicals, which can carry one or more condensed cycles, which can contain one or more heteroatoms belonging to Groups 13–17 of the Periodic Table of the Elements;

Z has the same meaning of Q or it can also be =$NR^6$, —O—, —S— and =$PR^6$, $R^6$ being selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical which can contain one or more heteroatoms belonging to Groups 13–17 of the Periodic Table of the Elements;

L is a divalent bridge connecting the moieties Q and Z;

M is an atom of transition metal selected from the Groups 3 to 10 or the lanthanide or actinide groups of the Periodic Table of the Elements (new IUPAC version);

$X^1$ same or different, is a ligand selected from hydrogen, a halogen, $R^9$, $OR^9$, $OSO_2CF_3$, $OCOR^9$, $SR^9$, $NR^9_2$ or $PR^9_2$ group, wherein $R^9$ is selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical, optionally containing one or more heteroatoms belonging to Groups 13–17 of the Periodic Table of the Elements;

p is an integer of from 0 to 3;

l is 0 or 1; and (c) a late transition metal complex of formula (II) or (III):

$$L^a M^a X^a_p X^{a'}_{s'} \quad (II)$$

$$L^a M^a A^a \quad (III)$$

wherein $M^a$ is a metal belonging to Group 8, 9, 10 or 11 of the Periodic Table of the Elements (new IUPAC notation);

$L^a$ is a bidentate or tridentate ligand of formula (VI):

$$\left[ R^{a1}_{m'} - E^1 \diagdown_{B} \diagup E^2 - R^{a1}_{n'} \right]^{q'} \quad (IV)$$

wherein:

B is a $C_1$–$C_{50}$ bridging group linking $E^1$ and $E^2$, optionally containing one or more atoms belonging to Groups 13–17 of the Periodic Table;

$E^1$ and $E^2$, the same or different from each other, are elements belonging to Group 15 or 16 of the Periodic Table and are bonded to said metal $M^a$;

the substituents $R^{a1}$, the same or different from each other, are selected from the group consisting of hydrogen, linear or branched, saturated or unsaturated $C_1$–$C_{20}$ alkyl, $C_1$–$C_{20}$ alkyliden, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to Groups 13–17 of the Periodic Table of the Elements; or two $R^{a1}$ substituents attached to the same atom $E^1$ or $E^2$ form a saturated, unsaturated or aromatic $C_4$–$C_8$ ring, having from 4 to 20 carbon atoms; m' and n' are independently 0, 1 or 2, depending on the valence of $E^1$ and $E^2$, so to satisfy the valence number of $E^1$ and $E^2$; q' is the charge of the bidentate or tridentate ligand so that the oxidation state of $M^a X^a_p X^{a'}_s$ or $M^a A^a$ is satisfied, and the compound (II) or (III) is overall neutral;

$X^a$, the same or different from each other, are monoanionic sigma ligands selected from the group consisting of hydrogen, halogen, —R, —OR, —OSO$_2$CF$_3$, —OCOR, —SR, —NR$_2$ and —PR$_2$ groups, wherein the R substituents are linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing one or more atoms belonging to Groups 13–17 of the Periodic Table of the Elements (new IUPAC notation), or two $X^a$ groups form a metallocycle ring containing from 3 to 20 carbon atoms;

$X^{a'}$ is a coordinating ligand selected from mono-olefins and neutral Lewis bases wherein the coordinating atom is N, P, O or S;

p' is an integer ranging from 0 to 3, so that the final compound (II) or (III) is overall neutral;

s' ranges from 0 to 3; and $A^a$ is a π-allyl or a π-benzyl group;

and optionally an Al-alkyl compound or an alumoxane or a compound capable of forming an alkyl metallocene cation; and (C) polymerizing one or more of said olefins $CH_2=CHR^1$, in one or more reactors, in the presence of the product obtained in step (B), wherein the process produces at least about 500 grams of a porous olefin polymer per gram of the solid catalyst component.

11. A process for polymerizing a heterophasic copolymer of propylene comprising the following steps:

(A) polymerizing, in at least one reactor, propylene or its mixtures with one or more olefins $CH_2=CHR^4$, $R^4$ being hydrogen, a $C_2$–$C_{20}$-alkyl or a $C_6$–$C_{12}$-aryl group, by a process comprising putting into contact in a polymerization reactor having a reactor temperature initially at a temperature $T^1$, one or more olefins of formula $CH_2=CHR^1$, $R^1$ being hydrogen, a $C_1$–$C_{20}$-alkyl or a $C_6$–$C_{12}$-aryl group with a catalyst obtained by reacting a solid catalyst component in the form of spheroidal particles comprising a compound of Ti or V not containing metal-π bonds and a Mg halide, optionally containing one or more electron donor compounds, with an aluminum-alkyl (Al-alkyl) compound, then raising the reactor temperature up to a polymerization temperature, wherein (I) if the temperature $T^1$ is lower than 40° C., the reactor temperature is raised up to the polymerization temperature in such a way that, for a time of at least one minute after the introduction of the catalyst system into the reactor, the reactor temperature is raised up to $T^2$ under the following condition:

$$\frac{T^2 - T^1}{m} > 10$$

wherein m is the time, expressed in minutes, employed for reaching the temperature $T^2$; or (II) if the temperature $T^1$ is 40° C. or higher, the reactor is maintained for a time of at least one minute at a temperature ranging from 45° C. to 65° C.; thereby producing at least about 500 grams of a polymer per gram of solid catalyst component having a content of units derived from the ethylene or the olefin of less than 20% by weight and a content of units derived from the propylene of greater than 80% by weight;

(B) optionally deactivating the catalyst used under (A) and contacting the product as obtained under step (A) with a compound selected from the group consisting of:

(a) compounds of Ti or V not containing a metal-π bond;

(b) compounds of transition metal M containing at least a M-π bond having a general formula (I):

$$QL_z Z M X^1_p \quad (I)$$

wherein Q is selected from substituted or unsubstituted cyclopentadienyl radicals, which can carry one or more condensed cycles, which can contain one or more heteroatoms belonging to Groups 13–17 of the Periodic Table of the Elements;

Z has the same meaning of Q or it can also be =NR$^6$, —O—, —S— and =PR$^6$, R$^6$ being selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical which can contain one or more heteroatoms belonging to Groups 13–17 of the Periodic Table of the Elements;

L is a divalent bridge connecting the moieties Q and Z;

M is an atom of transition metal selected from the Groups 3 to 10 or the lanthanide or actinide groups of the Periodic Table of the Elements (new IUPAC version);

$X^1$, same or different, is a ligand selected from hydrogen, a halogen, $R^9$, $OR^9$, $OSO_2CF_3$, $OCOR^9$, $NR^9_2$ or $PR^9_2$ group, wherein $R^9$ is selected from hydrogen, a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical, optionally containing one or more heteroatoms belonging to Groups 13–17 of the Periodic Table of the Elements;

p is an integer of from 0 to 3;

l is 0 or 1; and (c) late transition metal complex of formula (II) or (III):

$$L^a M^a X^a_p X^{a'}_{s'} \quad (II)$$

$$L^a M^a A^a \quad (III)$$

wherein $M^a$ is a metal belonging to Group 8, 9, 10 or 11 of the Periodic Table of the Elements (new IUPAC notation);

$L^a$ is a bidentate or tridentate ligand of formula (VI):

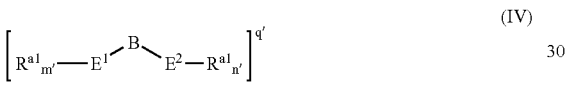

(IV)

wherein:

B is a $C_1$–$C_{50}$ bridging group linking $E^1$ and $E^2$, optionally containing one or more atoms belonging to Groups 13–17 of the Periodic Table;

$E^1$ and $E^2$, the same or different from each other, are elements belonging to Group 15 or 16 of the Periodic Table and are bonded to said metal $M^a$;

the substituents $R^{a1}$, the same or different from each other, are selected from the group consisting of hydrogen, linear or branched, saturated or unsaturated $C_1$–$C_{20}$ alkyl, $C_1$–$C_{20}$ alkyliden, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to Groups 13–17 of the Periodic Table of the Elements; or two $R^{a1}$ substituents attached to the same atom $E^1$ or $E^2$ form a saturated, unsaturated or aromatic $C_4$–$C_8$ ring, having from 4 to 20 carbon atoms; m' and n' are independently 0, 1 or 2, depending on the valence of $E^1$ and $E^2$, so to satisfy the valence number of $E^1$ and $E^2$; q' is the charge of the bidentate or tridentate ligand so that the oxidation state of $M^a X^a_p X^{a'}_s$ or $M^a A^a$ is satisfied, and the compound (II) or (III) is overall neutral;

$X^a$, the same or different from each other, are monoanionic sigma ligands selected from the group consisting of hydrogen, halogen, —R, —OR, —$OSO_2CF_3$, —OCOR, —SR, —$NR_2$ and —$PR_2$ groups, wherein the R substituents are linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing one or more atoms belonging to Groups 13–17 of the Periodic Table of the Elements (new IUPAC notation), or two $X^a$ groups form a metallocycle ring containing from 3 to 20 carbon atoms;

$X^{a'}$ is a coordinating ligand selected from mono-olefins and neutral Lewis bases wherein the coordinating atom is N, P, O or S;

p' is an integer ranging from 0 to 3, so that the final compound (II) or (III) is overall neutral;

s' ranges from 0 to 3; and $A^a$ is a π-allyl or a π-benzyl group;

and optionally an Al-alkyl compound or an alumoxane or a compound capable of forming an alkyl metallocene cation; and (C) polymerizing, in at least one reactor at least two olefins selected from those belonging to formula $CH_2=CHR^1$, $R^1$ being hydrogen, a $C_1$–$C_{20}$-alkyl or a $C_6$–$C_{12}$-aryl group and optionally a polyene, in the presence of a product obtained under step (B).

12. The process according to claim 11 wherein in step (C) ethylene is copolymerized with propylene and optionally with polyene.

* * * * *

UNITED STATES PATENT AND TRADEMARK OFFICE
CERTIFICATE OF CORRECTION

PATENT NO. : 7,183,332 B2 Page 1 of 1
APPLICATION NO. : 10/450603
DATED : February 27, 2007
INVENTOR(S) : Angelo Ferraro et al.

It is certified that error appears in the above-identified patent and that said Letters Patent is hereby corrected as shown below:

At col. 21, line 43, change "$_2$" to --2--

At col. 23, line 9, claim 11, line 29, after "OCOR$^9$" insert --SR$^9$--

Signed and Sealed this

Second Day of September, 2008

JON W. DUDAS
*Director of the United States Patent and Trademark Office*